United States Patent [19]
Jones et al.

[11] 3,819,520
[45] June 25, 1974

[54] MIXED ALCOHOLS IN WELL ACIDIZING

[75] Inventors: Loyd W. Jones; George B. Holman, Jr., both of Tulsa, Okla.

[73] Assignee: Amoco Production Company, Tulsa, Okla.

[22] Filed: Apr. 10, 1972

[21] Appl. No.: 242,476

[52] U.S. Cl. ............................ 252/8.55 C, 166/307
[51] Int. Cl. ............................................ E21b 43/27
[58] Field of Search......... 252/8.55 C, 143; 166/307

[56] References Cited
UNITED STATES PATENTS

| | | | |
|---|---|---|---|
| 2,024,718 | 12/1935 | Chamberlain | 252/8.55 |
| 2,124,530 | 7/1938 | Loomis et al. | 166/307 |
| 3,083,158 | 3/1963 | Markham | 252/8.55 |
| 3,254,718 | 6/1966 | Dunlap | 166/307 |
| 3,481,404 | 12/1969 | Gidley | 166/307 |

Primary Examiner—Herbert B. Guynn
Attorney, Agent, or Firm—Paul F. Hawley; Arthur McIlroy

[57] ABSTRACT

A mixture of an octanol and a lower alcohol is used with, ahead of, or behind aqueous acid solutions employed to acidize wells.

6 Claims, 1 Drawing Figure

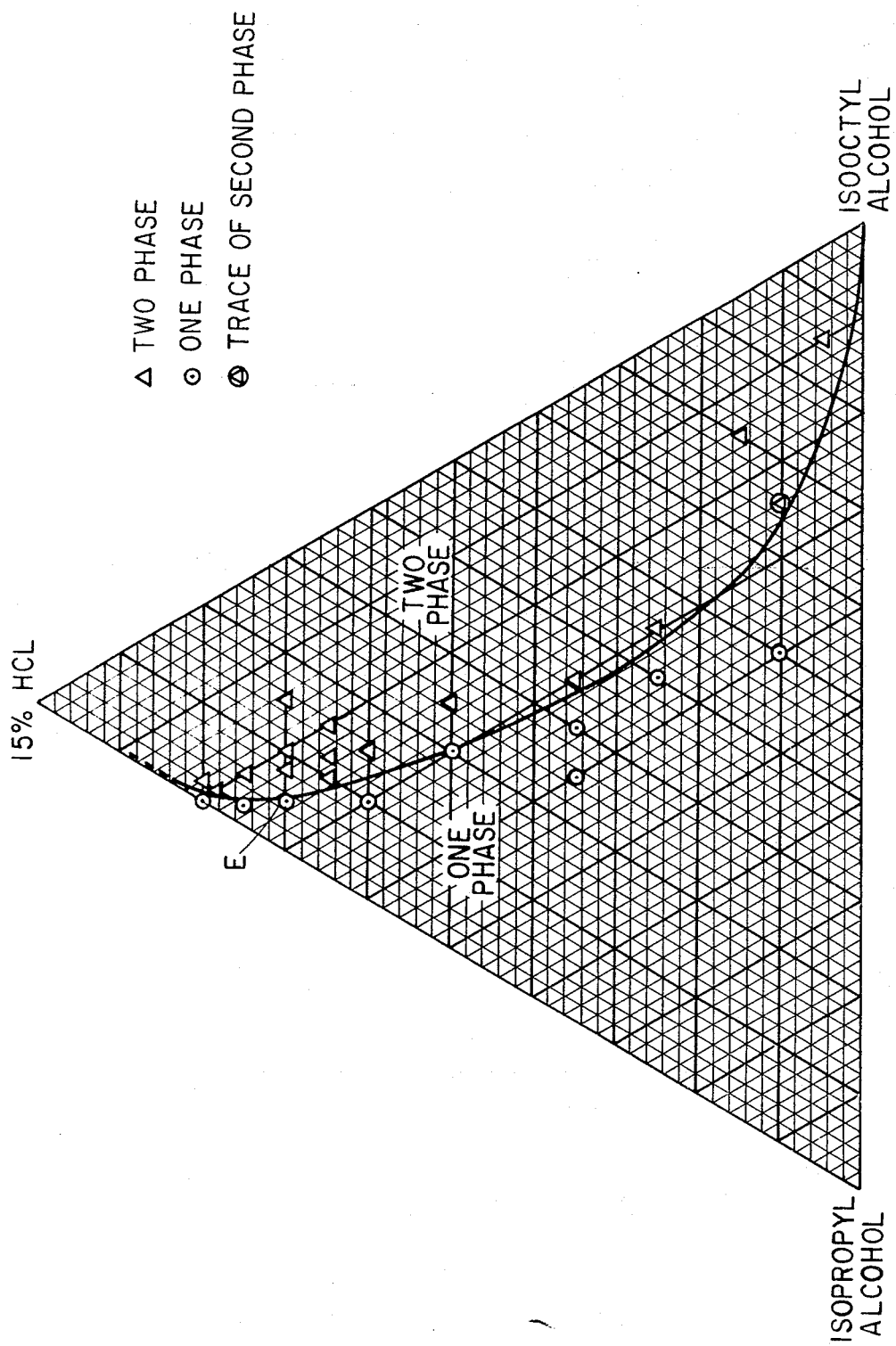

MIXED ALCOHOLS IN WELL ACIDIZING

For many years, oil wells have been acidized by an aqueous solution of an acid such as hydrochloric, hydrofluoric, acetic, and the like. A mutual solvent for oil and water is sometimes used in association with the acid. That is, the acid sometimes contains or is preceded, or followed by the mutual solvent. Some examples are described in U.S. Pat. No. 2,124,530 Loomis, et al; U.S. Pat. No. 3,254,718 Dunlap; U.S. Pat. No. 3,481,404 Gidley; and U.S. Pat. No. 3,548,945 Gidley. Other references showing the state of this art are listed in the Gidley patents. As Gidley comments, the reasons for the improved results are not fully understood. There seems to be general agreement, however, that avoiding emulsions is one object and displacement of oil, leaving the solid surfaces water-wet, is another. Another advantage of improving oil displacement, not previously emphasized, is an increase in the fraction of acid going into oil-bearing zones rather than into water-bearing zones. Aqueous acid solutions easily enter water-bearing zones since the acid solutions are miscible with the water in place. Aqueous acid solutions immiscibly displace oil much less easily. Therefore, most of the acid frequently goes into water-bearing zones to produce unwanted increases in water production rather than into oil-bearing zones to produce wanted increases in oil production.

An object of this invention is to improve the oil-displacing ability of an acid containing a solvent or a preflush or spearhead of the solvent. Still other objects will be apparent from the following description and claims.

SUMMARY OF THE INVENTION

In general, we accomplish the objects of our invention by incorporating a mixture of alcohols in the acid solution or by preceding or following the acid with the mixture. The mixed alcohols are made up of an octanol and a lower alcohol which may be ethanol, a propanol, or tertiary butanol. Preferably, the octanol is the mixture commercially available as isooctyl alcohol.

The drawing is a ternary diagram showing compositions of isooctyl alcohol, isopropyl alcohol, and 15 percent aqueous hydrochloric acid solution which form a single phase.

We have found that one of the principal reasons for the effectiveness of the mutual solvents of U.S. Pat. NO. 3,254,718 Dunlap, for example, is the low interfacial tension between oil and the aqueous acid solution in the presence of the mutual solvent. Some materials, such as ethylene glycol monobutyl ether, are particularly effective. This probably explains the recent successful use of this material is well acidizing. Interfacial tension figures are shown in Table I. These interfacial tensions were measured against $C_{10}$–$C_{12}$ hydrocarbons. This is a petroleum fraction containing almost entirely hydrocarbons having from 10 to 12 carbon atoms per molecule.

TABLE I

| TEST NO. | SOLVENT | CONC. OF SOLVENT IN ACID, VOL. % | INTERFACIAL TENSION, DYNES/CM |
|---|---|---|---|
| 1 | None | 0 | 32.2 |
| 2 | Methyl Isopropyl Ketone | 10 | 19.1 |
| 3 | Ethylene Glycol Monobutyl Ether | 10 | 11.6 |
| 4 | Methyl Isopropyl Ketone | 30 | 6.8 |
| 5 | Ethylene Glycol Monobutyl Ether | 30 | 5.5 |
| 6 | Isopropyl Alcohol | 30 | 11.7 |
| 7 | Isopropyl Alcohol plus Isooctyl Alcohol | 25 5 | 1.7 |

All acid in Table I was about 15% by weight aqueous hydrochloric acid solution. Interfacial tension measurements are averages of at least two and usually three determinations. These were made using a DuNouy ring tensiometer.

The reduction in interfacial tension by solvents such as those named in U.S. Pat. No. 3,254,718 Dunlap, and U.S. Pat. No. 3,548,945 Gidley, is shown by a comparison of Test 1 with Test 2 and 3. The concentration of 10% was used because at higher concentrations ethylene glycol monobutyl ether frequently does not form a clear stable solution. Thus, in Test 5, the acid solution was not clear but the ether formed a rather stable hazy suspension. In Tests 4, 6 and 7, the solutions were clear. The lower interfacial tension in Test 5 may be due to limited solubility of the solvent, resulting in concentration of the solvent at the oil-acid interface.

The rather startling reduction in interfacial tension which results when a little isooctyl alcohol is substituted for a small amount of isopropyl alcohol is shown by a comparison of Tests 6 and 7. It is possible that this is due to the very low solubility of isooctyl alcohol in water, causing this material to concentrate at the interface. Whatever the explanation, however, it is obvious that a much lower interfacial tension between the acid and oil can be achieved by use of a mixture of the octanol with a lower alcohol in the acid. The lower interfacial tension, of course, greatly improves displacement of oil by acid.

Since the octyl alcohols are substantially water-insoluble, there are solubility problems in use of the combination of alcohols with acids. These are shown in the drawing which indicates that at least about 22% of the lower alcohol must be used to solubilize as little as 2% of the octanols in the acid. However, use of only a little more of the lower alcohol, 30%, solubilizes 20% of the mixed octanols. The preferred composition used in Test 7 of Table I is indicated as point E on the drawing. This contains about 5% by volume of isooctyl alcohol, about 25% of isoopropyl alcohol, about 70% of 15% hydrochloric acid.

From a practical standpoint, there seem to be no alternates to the octanols. Higher molecular weight alcohols suffer from two defects. First, they have enough surface activity to promote emulsification. Second, they promote oil-wetting of solid surfaces, including surfaces of finely divided particles. These particles can also stabilize emulsions. Alcohols with molecular weights slightly less than the octanols are too water-soluble to provide the effects of the oil-soluble but substantially water-insoluble octanols. The eight-carbon-atom alkyl radical of the octanols is much shorter than those in ordinary surface-active agents, but the octanols do seem to have some surface-active properties accounting for the low interfacial tension.

The preferred octanol is available commercially under the tradename "Isooctyl Alcohol." This material is actually a mixture of alcohols which are almost entirely octanols. These octanols are nearly all branched. Single octanols may be used if desired, however. Small amounts, up to about 10%, of the other alcohols can be tolerated, particularly if they are close to the octanols in molecular weight. The octanols should be unsubstituted and aliphatic or alicyclic. They may be saturated or unsaturated In summary, the octanol should have the formula ROH, in which R is an unsubstituted saturated or unsaturated aliphatic or alicyclic group having eight carbon atoms.

There are a few alternates to isopropyl alcohol. Methanol has too little solibilizing action for the octanols, so excessively large volumes of methanol must be used to solubilize a small amount of octanol into aqueous acid solutions. For example, two milliliters of isooctanol would not dissolve in a solution of 30 milliliters of methanol and 70 milliliters of a 15% aqueous hydrochloric acid solution. Even 1 milliliter of isooctanol in 100 milliliters of this methanol and acid solution formed a hazy solution. Therefore, methanol should not be considered an alternate of isopropanol. Ethanol and normal propanol can both be used. Of the butanols, only tertiary butanol can be used, the solubility of all other butanols in aqueous acid solutions being much too low. Thus, the class of satisfactory lower alcohols includes only ethanol, isopropyl alcohol, normal propanol, and tertiary butanol. Of these, isopropyl alcohol is greatly preferred, not only for its solvent characteristics, but also because of its low cost. The lower alcohols can be used singly or mixed. Thus, reference herein to "a lower alcohol" is intended to include not only a single alcohol, but also mixtures of alcohols. Up to about 10% of impurities can be present in the lower alcohols. These may include other water-soluble alcohols, other water-soluble organic solvents, or the like.

A few other low molecular weight water-soluble organic solvents can be substituted for the lower alcohols. The lower alcohols are, however, more compatible with the octanols. In addition, it has been found that the lower alcohols have a very desirable property of breaking many of the emulsions which form due to naturally occurring emulsifiers in some crude oils. For these reasons, the low molecular weight solvent should be limited to the lower alcohols named above.

The solution of acid to which the alcohols are added may be almost any of the aqueous solutions of water-soluble acids commonly employed for acidizing formations. These may include aqueous solutions of hydrochloric acid, formic acid, acetic acid, hydrofluoric acid, or the like, but should not include nitric acid because of the strong oxidizing effect of this acid on alcohols. Any of the water-soluble, non-oxidizing acids ordinarily used for well acidizing can be used, however. The aqueous acid solution may contain from about 5 to about 30% by weight of the acid but is preferably the 15% hydrochloric acid normally used in well acidizing.

As the acid travels into the formation, it reacts with the formation. Therefore, after the leading edge of the acid has traveled a short distance into the formation, this leading edge is at least partially spent acid. Then, the question is what is the interfacial tension between oil and spent acids containing the alcohols. To check this most simply, a solution of calcium chloride was prepared which contained a little excess acid. The amount of calcium chloride was the amount which would be produced by reacting 13% hydrochloric acid with limestone. The excess acid was 2% by weight. Results of interfacial tension measurements are shown in Table II.

TABLE II

| TEST No. | SOLVENT | CONC. OF SOLVENT IN SPENT ACID, VOL. % | INTERFACIAL TENSION, DYNES/CM |
|---|---|---|---|
| 8 | Isopropyl Alcohol plus Isooctyl Alcohol | 25 5 | 0.5 |
| 9 | Ethylene Glycol Monobutyl Ether | 30 | 0.4* 0.3** |
| 10 | Ethylene Glycol Monobutyl Ether | 10 | 0.5 |

*Between bottom and middle layers.
**Between middle and top layers.

As in Table I, the interfacial tensions in Table II were between the indicated solutions and a $C_{10}$–$C_{12}$ fraction of petroleum. Interfacial tensions between spent acids and hydrocarbons are obviously even lower in the presence of the mixed alcohols than interfacial tensions between the original acid and oil with the same alcohols. This means that in a producing well, when flow is reversed, the oil very effectively displaces the spent acid from the formation.

In Test 9, it will be noted that two interfacial tensions are given. This is because three phases formed with two separate interfaces. When 30% of the ether was mixed with 70% spent acid, two phases separated with 36% on top and 64% on the bottom. When an equal volume of the $C_{10}$–$C_{12}$ hydrocarbons was added, three phases formed with about 55% in the top layer, about 10% in the middle, and 35% in the bottom layer.

The 10% glycol ether solution in spent acid formed a single phase. When mixed with $C_{10}$–$C_{12}$ hydrocarbons, only two phases formed. Therefore, a single interfacial tension is given in Test 10. The low interfacial tensions in Tests 9 and 10 probably explain, at least in part, the successful field use of the monobutyl ether of ethylene glycol. Obviously, our mixed alcohols do as well as this ether with spent acid and better with the original acid.

Emulsion-prevention tests were run to determine the effects of the alcohols on emulsion-forming tendency. In preparation for these tests, a solution was first prepared containing 5% isooctyl alcohol, 25% isopropyl alcohol, and 70% of a 15% aqueous solution of hydrochloric acid. Another solution was prepared containing the same amounts of alcohols but with 70% of a 28% aqueous solution of hydrochloric acid. To a portion of each of these two solutions 0.5% of an acid inhibitor was added. This inhibitor is described in U.S. Pat. No. 3,007,454 Monroe et al. This made four solutions, two with and two without corrosion inhibitors. To a portion of each of these four solutions, marble chips were added in an amount in excess of the quantity necessary to react with the acid. This produced four solutions of spent acids with alcohols and unreacted solvents. Each of the eight solutions was tested for emulsifying tendency by the following procedure.

Fifty milliliters of the solution to be tested were introduced into a stoppered 100-milliliter graduated cylinder. To each was added 50 milliliters of a crude oil form the Midland Farms field in Texas. This crude oil was selected since it has a considerable emulsifying tendency with acids and spent acids. This mixture was then stirred at high speed for one minute. The resulting emulsion was allowed to stand and the milliliters of separated aqueous phase was noted at various times. Results of tests of the eight solutions described above are presented in Table III, together with results of tests of 15% and 28% acid solutions without alcohols.

of the test. With the alcohols present, complete breakout of the water phase occurred in every case in 10 minutes and sometimes less. The interfaces were all clean and precise.

It will be noted that the volume of aqueous phase was less than 50 milliliters in every test using alcohols. It was less with spent acids than with unspent acids. The probable reason is that some of the alcohols transferred into the oil phase. In the case of the spent acids, the high concentration of calcium chloride seems to have salted the alcohols out of the water solution causing them to transfer into the oil phase. The alcohols even seemed to solubilize some of the water into the oil phase in some cases. Such transfer of materials throughout the oil-water interface may account for the more effective displacement of one phase by the other. The interface must be rather indefinite while such transfers are taking place.

It was observed that the surfaces of the graduated cylinders and the surfaces of the undissolved solids in the spent acids were left clean and water-wet when no corrosion inhibitor was present. When the corrosion inhibitor was used, however, there were oil-wet spots on the surfaces of the cylinders, but the undissolved solids seemed to remain entirely water-wet. This shows the water-wetting ability of the mixed alcohols. Even the small amount of high molecular weight surface-active materials in the corrosion inhibitor obviously caused a small amount of oil-wetting. This illustrates the importance of avoiding such materials. Our unique mixture of alcohols is able to provide low interfacial tension without the use of such ordinary surface-active chemicals.

TABLE III

| SETTLING TIME, MIN. | SEPARATION, ML OF AQUEOUS PHASE | | | | | |
|---|---|---|---|---|---|---|
| | 28% ACID BLANK* | | 15% ACID BLANK* | | 28% ACID WITH ALCOHOLS | |
| | UNSPENT | SPENT | UNSPENT | SPENT | UNSPENT | SPENT |
| 1 | 0 | 0 | 0 | 0 | 22 | 10 |
| 2 | 0 | 0 | 0 | 0 | 36 | 18 |
| 3 | 0 | 0 | 0 | 0 | 43 | 20 |
| 4 | 0 | 0 | 0 | 0 | 45 | 21 |
| 5 | 0 | 0 | 0 | 0 | 45 | 22 |
| 6 | 0 | 0 | 0 | 0 | 45 | 24 |
| 7 | 0 | 0 | 0 | 0 | 45 | 28 |
| 8 | 0 | 0 | 0 | 0 | 45 | 30 |
| 9 | 0 | 0 | 0 | 0 | 45 | 32 |
| 10 | 0 | 0 | 0 | 0 | 45 | 34 |
| 20 | — | — | — | — | 45 | 34 |
| 30 | — | — | — | — | 45 | 34 |

| SETTLING TIME, MIN. | SEPARATION, ML OF AQUEOUS PHASE | | | | | |
|---|---|---|---|---|---|---|
| | 15% ACID WITH ALCOHOLS | | 28% ACID WITH ALCOHOLS & INHIB. | | 15% ACID WITH ALCOHOLS & INHIB. | |
| | UNSPENT | SPENT | UNSPENT | SPENT | UNSPENT | SPENT |
| 1 | 12 | 6 | 28 | 7 | 5 | 2 |
| 2 | 26 | 12 | 38 | 22 | 10 | 7 |
| 3 | 37 | 16 | 40 | 26 | 16 | 10 |
| 4 | 43 | 18 | 42 | 33 | 22 | 14 |
| 5 | 44 | 20 | 45 | 38 | 29 | 18 |
| 6 | 44 | 22 | 45 | 43 | 34 | 24 |
| 7 | 44 | 24 | 45 | 43 | 39 | 28 |
| 8 | 44 | 25 | 45 | 43 | 43 | 32 |
| 9 | 44 | 28 | 45 | 43 | 43 | 35 |
| 10 | 44 | 31 | 45 | 43 | 43 | 35 |
| 20 | 44 | 31 | 45 | 43 | 43 | 35 |
| 30 | 44 | 31 | 45 | 43 | 43 | 35 |

*Blanks contained no alcohols

The emulsifying tendency of the crude oil without alcohol is clearly shown in the first four columns. No water breakout occurred in ten minutes, the usual time Our acidizing process can be used to treat oil-producing wells or water-injection wells in a water-flooding process for an oil-bearing formation. In a producing well, the acid and alcohol are injected into the oil-bearing formation, after which the well is returned to oil-producing operation. In an injection well, the acid and alcohol are injected into the oil-bearing formation and are followed by flooding water.

In either a producing of injection well, the mixed alcohol can be mixed with the acid solution or can precede or follow the acid solution. The principal value of the alcohols preceding the acid solution is the displacement of the oil ahead of the acid, thus decreasing mixing and possible emulsification. Such a batch of alcohols also acts to dissolve alcohol-soluble organic deposits which may otherwise block flow of acids into oil-bearing zones. This batch of alcohols also acts to break any emulsions which might tend to form due to naturally present emulsifying agents. The value of the alcohols mixed with the acid is the reduction of interfacial tension between the acid and to improve displacement of oil by the acid, leaving solid surfaces, particularly finely divided solids, water-wet. Alcohols following the acid are of value to displace and dissolve oil and organic solids not displaced or dissolved by previous steps. This is particularly true if alcohols have not been used in previous steps. A batch of alcohols following the acid solution is particularly valuable in a water-injection well to insure displacement of any remaining oil, thus making more pore space available for flow of injected water into the formation.

Instead of injecting all the alcohols ahead of, with, or following the acid solutions, the alcohols can be divided into two parts and used in two places. For example, one portion may precede the acids and the other may be mixed with the acid solution. The alcohols can also be divided into three parts and used before, with, and following the acid solution.

The amount of acid may be anywhere within the range from the few hundred to the several thousand gallons ordinarily used in well-acidizing. However, our treatment is intended particularly for the zone immediately surrounding a well bore, so that volumes are usually somewhat smaller than average. Preferably, they are from about 500 to about 5,000 U.S. gallons. Stated in another way, use of from about 10 to about 500 gallons of acid per foot of formation thickness, as recommended in U.S. Pat. No. 3,548,945 Gidley, is satisfactory.

If the octanol is to have much effect, it should be present in an amount of at least about 2%. As previously noted, this requires about 22% of the lower alcohol to solubilize the octanol in the aqueous acid solution. By use of at least about 32% by volume of isopropanol, any amount of octanol can be solubilized. Use of about 5% octanol and 25% isopropyl alcohol is preferred. This is principally for economic reasons since the cost of the isooctyl alcohol is considerably greater than either the cost of the isopropyl alcohol or the acid solution.

It is usually best to pre-mix the alcohols before adding them to the acid in order to avoid imbalance between the alcohols which could result in the formation of a two-phase system. These mixed alcohols are then added to the acid with agitation to prepare a uniform treating solution. The volume of mixed alcohols is ordinarily less than the volume of aqueous acid solution, since action of the acid on solid constituents of the formation is usually the principal desired function. In some cases, however, the action of the alcohols on emulsions and organic materials in the well and in the pores of the formation is more important. In such cases, the volume of mixed alcohols can exceed the volume of acid.

If the alcohols and acids are mixed, the amount of alcohols can vary from about 30percent to about 70% by volume of the resulting solution of alcohols and acid. If a spearhead or preflush batch of alcohols precedes the acid solution, the volume of this spearhead should vary from about 10% of the volume of acid solution for large acid treatments to about 100% of the acid solution volume for small acid treatments. About the same volumes should be used for batches of alcohols used as an afterflush to displace the acid solution into the formation.

As indicated above, the principal application of our process are to oil-producing wells and to injection wells in waterflooding operations. The process is also sometimes helpful for treating gas wells and gas condensate wells. Many gas wells produce some oil, just as many oil wells produce some gas. Therefore, organic deposits can form in and around gas wells. Many gas wells produce water. Therefore, mineral deposits can also form in and around gas wells. When gas wells are acidized to remove such mineral deposits and otherwise increase the flow of gas to the wells, oil present in the formation can emulsify with the acid just as it can in oil wells. Thus, it will be apparent that many of the same problems, which make use of our mixed alcohols advisable in oil-well acidizing, frequently also occur in gas and gas condensate wells.

Even if little oil or water are produced by a gas well, use of our mixed alcohols is often advantageous. The surface tension of ordinary acid and spent acid solutions is in the range above 70 dynes per centimeter. This makes it difficult for the acid to enter the smaller pores of the formation. The high surface tension also makes it difficult for the gas to displace the spent acid from the small pores. The problems are particularly severe if the pore surfaces are oil-wet. When our mixed alcohols are added to aqueous acid solutions, the surface tension is reduced into the range below 30 dynes per centimeter. The same is true for both the alcohol and water phases after the acid is spent. The lower surface tensions permit the acid to enter small pores more easily and also facilitate removal of the spent acid from these pores. In addition, the alcohols aid by tending to leave the pore surfaces water-wet rather than oil-wet. For the above-described reasons, it is frequently desirable to use our mixed alcohols with aqueous acid solutions employed for acidizing gas and condensate wells.

Our process will be better understood from the following example. An exemplary well is a little over 6,000 feet deep. Casing has been cemented to total depth and perforated from about 5,970 feet to about 5,990 feet opposite an oil-bearing limestone formation. The oil has some tendency to emulsify with water and to form a sludge at the interface with water. The oil-producing rate has declined more rapidly than it should, indicating a plugging action from inorganic or organic materials, or both. A packer is run into the well on open-ended tubing, and is set just above the perforations.

On the surface, a mixture of alcohols is prepared, containing 250 U.S. gallons of isooctyl alcohol and 1,250 U.S. gallons of isopropyl alcohol. About 900 gallons of this mixture is blended with about 2,500 gallons of 15% aqueous hydrochloric acid solution to form a uniform solution. The remaining 600 gallons of mixed alcohols is injected down the tubing first and is followed by the 3,400 gallons of mixed acids and alcohols. The acid and alcohol solution is displaced down the tubing and into the formation by 2,000 gallons of water. The well is shut-in for about 24 hours. It is then returned to production at an increased rate due to the action of the acid and alcohols.

Several alternates and variations are described above by way of example. Other variations and alternates include such things as adding corrosion inhibitors to the acid solution. These should preferably be of a non oil-wetting nature, such as arsenic compounds and acetylenic alcohols, to avoid destroying the non surface-active nature of our treatment. In appropriate special cases, however, some surface-active agents, such as demulsifiers or emulsion preventers, may be added. The acid and alcohols may be injected as alternated small batches. Instead of using a single acid, a mixture of acids, such as hydrochloric and hydrofluoric may be used. As noted in the example, the acid may be followed into the formation of water in a producing well as well as in a water-injection well. The treatment is applicable to increasing formation permeability near wells other than water-injection wells. A gas-injection well is an example. Still other alternates and variations will be apparent to those skilled in the art. Therefore, we do not wish to be limited to the examples described above, but only by the following claims.

We claim:

1. An acidizing composition for oil-bearing formations consisting essentially of from about 30 to about 76 volume percent of an aqueous solution of a well acidizing nonoxidizing water-soluble acid and from about 70 to about 24 volume percent of a mixture of an octyl alcohol and a lower aliphatic alcohol selected from the group consisting of ethanol, the propyl alcohols and tertiary butyl alcohol, said octyl alcohol constituting at least about 2 volume percent of said composition and said lower aliphatic alcohol being present in a concentration of at least about 22 volume percent of said composition, said compositon being capable of lowering the interfacial tension between the oil in said formation and said composition without the use of an added surface-active agent.

2. The solution of claim 1, wherein the octyl alcohol component consists essentially of a mixture of unsubstituted eight carbon atom alcohols.

3. The solution of claim 1, in which the acid is selected from the group consisting of hydrochloric acid, hydrofluoric acid, and mixtures thereof.

4. The acidizing composition of claim 1 in which the lower aliphatic alcohol is isopropyl alcohol.

5. The acidizing composition of claim 4 in which the isopropyl alcohol is present in a concentration of at least about 32 percent by volume.

6. A single phase acidizing solution consisting essentially of 15% aqueous hydrochloric acid, isooctyl alcohol and isopropyl alcohol, the composition of said solution defining a point falling to the left of the phase boundary line of the ternary diagram shown in the accompanying drawing.

* * * * *

PO-1050
(5/69)

UNITED STATES PATENT OFFICE
CERTIFICATE OF CORRECTION

Patent No. 3,819,520      Dated June 25, 1974

Inventor(s) Loyd W. Jones and George B. Holman, Jr.

It is certified that error appears in the above-identified patent and that said Letters Patent are hereby corrected as shown below:

Column 2, line 1, "is" should be --in--.

Column 5, line 14, "3,007,454 should be --3,077,454--;
       line 25, "form" should be --from--.

Column 7, line 6, "of" should be --or--;
       line 18, after "and" insert --oil--.

Signed and sealed this 3rd day of December 1974.

(SEAL)
Attest:

McCOY M. GIBSON JR.            C. MARSHALL DANN
Attesting Officer             Commissioner of Patents